April 19, 1955 G. E. SCHUMANN 2,706,538
BUILDING STRUCTURES

Filed Dec. 17, 1948 13 Sheets-Sheet 4

Inventor
GEORGE E. SCHUMANN

By James E. Toomey
ATTORNEY

Inventor
GEORGE E. SCHUMANN.
By James E. Toomey
ATTORNEY

April 19, 1955  G. E. SCHUMANN  2,706,538
BUILDING STRUCTURES
Filed Dec. 17, 1948  13 Sheets-Sheet 7

Inventor
GEORGE E. SCHUMANN.
By James E. Toomey
ATTORNEY

April 19, 1955

G. E. SCHUMANN

2,706,538

BUILDING STRUCTURES

Filed Dec. 17, 1948

Inventor

GEORGE E. SCHUMANN.

By James E. Tooney

ATTORNEY

April 19, 1955  G. E. SCHUMANN  2,706,538
BUILDING STRUCTURES
Filed Dec. 17, 1948  13 Sheets-Sheet 9

Inventor
GEORGE E. SCHUMANN.

By James E. Toomey
ATTORNEY

April 19, 1955 G. E. SCHUMANN 2,706,538
BUILDING STRUCTURES
Filed Dec. 17, 1948 13 Sheets-Sheet 10

Inventor
GEORGE E. SCHUMANN.

By James E. Looney
agt.

ATTORNEY

United States Patent Office 2,706,538
Patented Apr. 19, 1955

2,706,538

BUILDING STRUCTURES

George E. Schumann, Piedmont, Calif., assignor to Henry J. Kaiser Company, a corporation of Nevada Application December 17, 1948, Serial No. 65,861

6 Claims. (Cl. 189—1)

This invention relates to a building structure that is readily assembled and dismantled. More particularly, it relates to such a structure comprising a base, inclined vertical columns and roof trusses radiating from a central circular member so constructed and arranged as to provide a maximum of unobstructed wall space while at the same time being capable of supporting concentrated loads upon the roof thereof.

In the past, display units comprising building structures have been characterized by the disadvantages of being incapable of supporting heavy concentrated loads such as autos or the like, unless bearing members of large cross-section were used which decreased the area for unobstructed vision and hindered one from completely viewing the display therein. Upon reduction of the cross-section of the bearing members to the extent desired for display purposes there was resultant reduction in the weight which could be supported. Further advantages resulted when attempts were made to construct such a building which was capable of ready assembly and dismantling. These and other disadvantages are overcome by the present invention.

It is an object of this invention to provide a building structure for use as a novel display unit having vertical roof-bearing members of relatively small cross-section and high-load bearing ability, so as to provide a maximum of unobstructed space for viewing the interior of the building from without.

It is a further object of this invention to provide a novel display unit having a roof structure consisting of a relatively light and rigid construction and of sufficient strength to support heavy, concentrated loads on a portion thereof, the weight of which is in turn equally distributed upon a plurality of columns of relatively narrow cross-section.

It is an additional object of this invention to provide a display unit which furnishes unusually large unobstructed space for glass panels or windows, and which is so ventilated as to prevent breakage of glass window panels upon closing doors or creating other pressure surges.

A still further object of this invention is to provide a novel compact display unit which can be readily and easily dismantled and assembled.

Another object of this invention is to provide a display unit with a doorway framework which does not unbalance the normal distribution of the structural loads substantially equally upon all the tubular columns supporting the roof loads of the display unit.

An additional object of this invention is to provide novel fastening means for rigidly maintaining a plurality of glass wall panels in place.

An additional object is the provision of a turntable of unusual stability for use in connection with building structures of this type or the like.

A further object of this invention is to provide a novel, attractive, and compact building structure which may be used for displaying merchandise such as automobiles.

This invention generally relates to a building structure wherein a plurality of spaced apart vertical columns are mounted upon a base in such a way as to slant slightly outwardly therefrom. The outer extremities of roof supporting or load bearing members are then positioned upon these columns, while their inner extremities are detachably fastened to a substantially large cylinder or pipe so as to form a wheel-like roof structure adapted to support a concentrated weight at the central portion thereof.

In the preferred form of the invention the concentrated load comprises a turntable adapted to receive an article for display purposes, such as an automobile; a novel arrangement for connecting glass panels to the columns of the building and its base; a door frame constructed in such manner as to not unbalance the normal distribution of the roof load upon each of the tubular columns; and a system of ventilation that includes means for dissipating sudden air surges within the structure that would normally break the glass wall panels.

Further objects and advantages of the invention will be apparent from the following detailed description, taken in conjunction with the drawings wherein.

Figure 1:
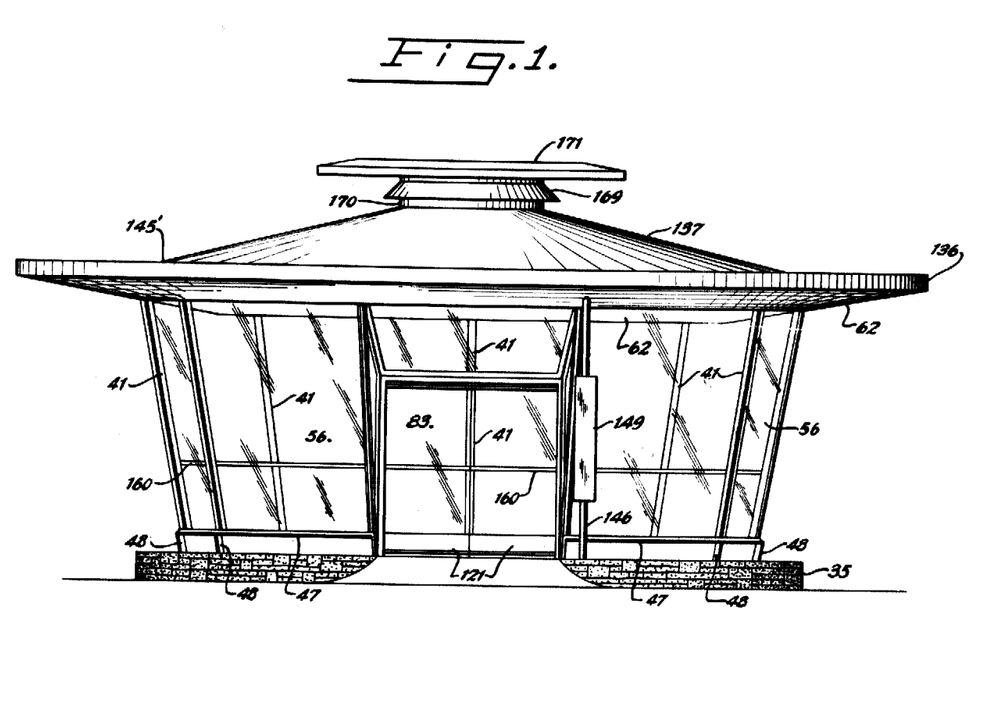
Figure 1 is a front elevation of the display unit with an automobile turntable mounted thereon.
Figure 2:
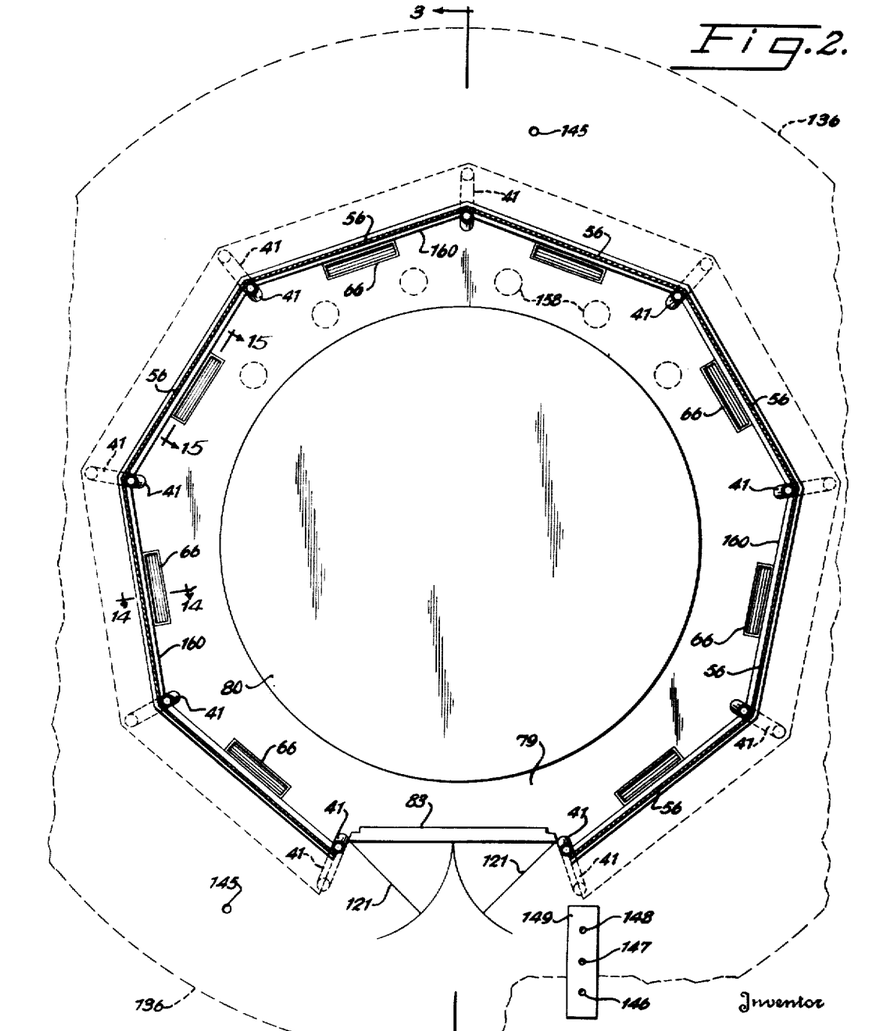
Figure 2 is a floor plan of the display unit, with the outline of the roof being shown in dotted lines, and with other parts of the display unit being shown in section.
Figure 3:
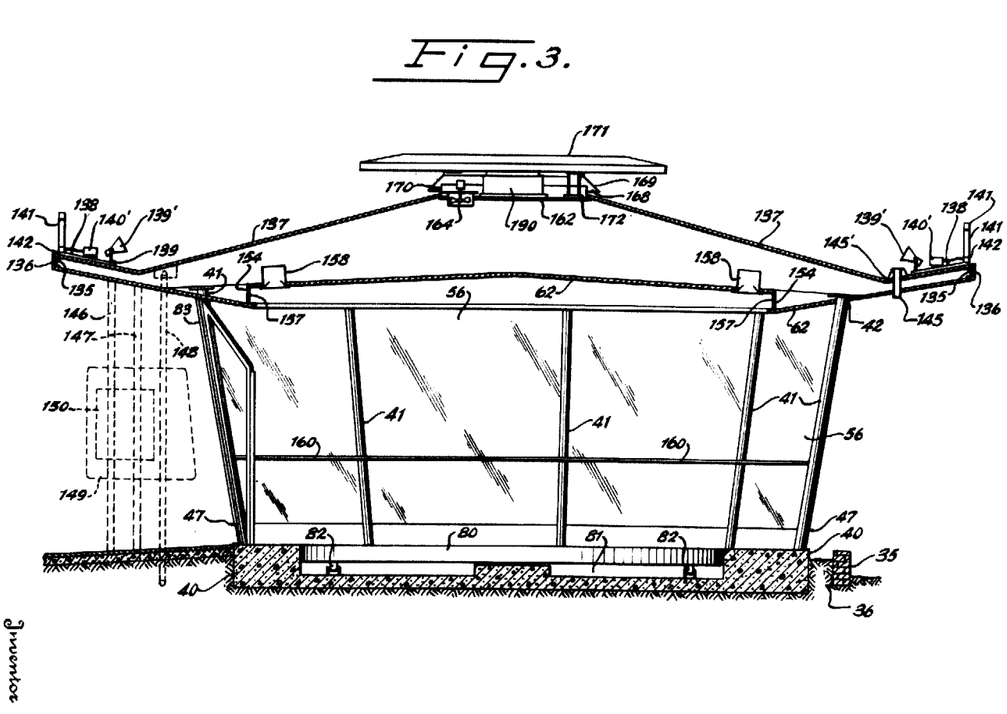
Figure 3 is a side elevation of the display unit, partly in section along the line 3—3 of Figure 2.
Figure 6:
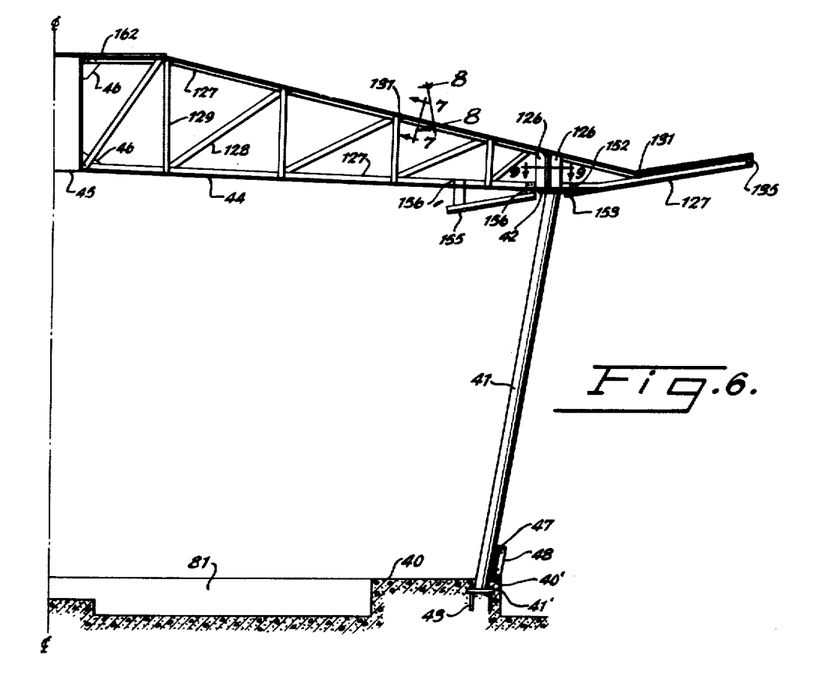
Figure 6 is a side view of a conventional roof truss and a tubular column used in supporting the roof.

With reference to the drawings and particularly Figures 3 and 6, a base 40, preferably of concrete, removably supports within the preformed depressions 40' by means of the base plate 41', bolts 43 and nuts 43', a plurality of tubular metallic columns 41 each of which slants slightly outwardly from the vertical. If desired, a retaining wall such as that indicated by 35 may be disposed in a circular or any other artistic fashion around the outside of the base 40 and shrubbery or flowers planted in the space 36 formed between the base and retaining wall. A horizontal bearing plate 42 is positioned on top of each of the tubular metallic columns 41 and a truss or supporting member 44 rests thereon adjacent its outer extremity, as best shown in Figure 6. The inner extremity of each truss member 44 is detachably connected to a vertically disposed central pipe or cylinder 45, best shown in Figures 6 and 25, in such a manner as to form a wheel-like structure by being removably secured by bolt means 46' to a plurality of gussets 46, which in turn are welded to the cylinder or pipe 45. Although it is a preferred embodiment of the invention that the truss members disclosed in the drawings be employed, it is apparent that trusses of other designs, as well as other types of structural members—such as plate girders—may be used in lieu thereof. Furthermore, the trusses may be of a type that can be welded, bolted or riveted directly to the pipe 45.

Figures 9, 10, 11:
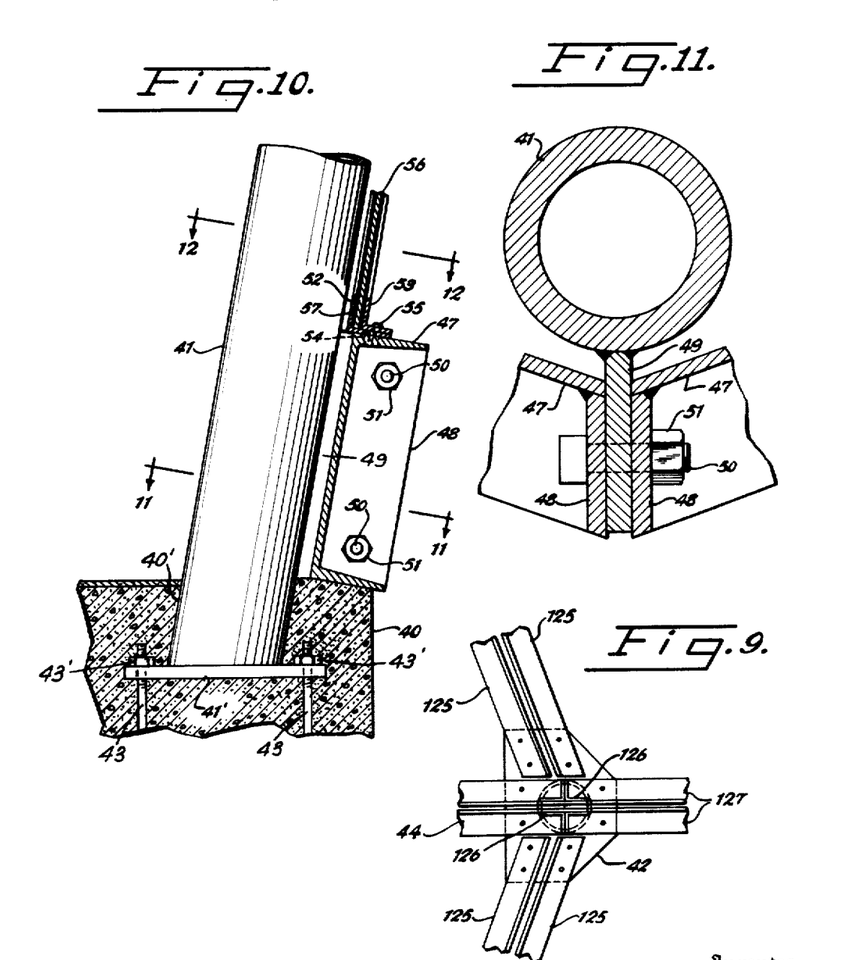
Figure 9 is a plan view taken along the lines 9—9 of Figure 6.
Figure 10 is an elevational side view partly in section of the bottom sill support for the glass wall panels.
Figure 11 is a sectional view taken along the lines 11—11 of Figure 10.

In order to augment the rigidity of the tubular metallic columns 41 at their base portions as well as to improve the appearance of the structure, there is disposed upon the outer extremity of the base 40 and adjacent the said columns, horizontal channel members 47, although other suitable structural members could be used, having their end portions welded to bars 48, which in turn are removably secured to a gusset 49 welded to the tubular metallic column adjacent its lower extremity by means of bolts 50 and nuts 51, as best shown in Figures 10 and 11.

Although it is within the contemplation of this invention that the use of wall panels may be dispensed with, it is the preferred embodiment that wall panels, such as those made of glass, be employed, and accordingly, as shown in Fig. 10 the aforementioned horizontal channel irons 47 are also adapted to furnish a bottom sill support for the glass wall panel 56 by having secured thereto a pair of angular metallic strips 52 and 53 of substantially the same length as and removably fastened in overlapping relationship to the upper portion of the said horizontal channel irons 47 by means of the screws 54 and 55 respectively, the angular metallic strips being sufficiently spaced apart along their uppermost projections so as to provide a recess wherein the lower edge of a glass panel 56 may be positioned.

To fasten the lower edge of the glass panel 56 more securely in place, and to prevent pressure against the same, rubber tape 57 is then inserted between glass panel 56 and the metallic strips.

Figure 12:
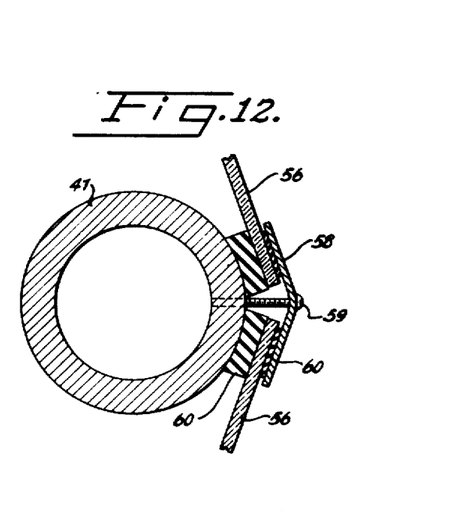
Figure 12 is a sectional view taken along the lines 12—12 of Figure 10.

As best shown in Figure 12, the interstices occurring between the individual glass panels 56 at their juncture with the tubular metallic columns 41 are covered by means of an angular metallic strip or window mullion 58 removably connected to the tubular metallic column 41, and in abutting relationship with the uppermost projection of the angular metallic strip 53, by means of screws 59. In addition to covering the interstices between the glass panels, it will be seen that upon turning the screws 59, the side edges of glass panels 56 positioned between the tubular metallic column 41 and the metallic strip 58 will be locked between the said strip and column. Rubber tape 60 is inserted between the glass panels 56 and strip 58 and the glass panels and the column 41 to cushion the glass between the strip and column.

Figure 13:
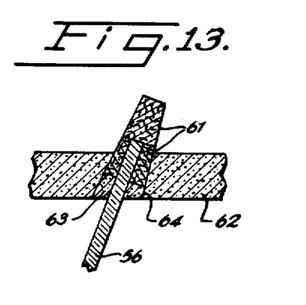
Figure 13 is an elevational sectional view of a portion of the ceiling of the display unit with a window head inserted therein.

The upper edge of the glass panel 56, shown in Figure 13, is cushioned by means of the felt pads 61 within a recess 64 in the plastered ceiling 62 of the building structure and then rigidly lodged therein by filling the lower portion of the recess with plaster 63.

Figure 14:
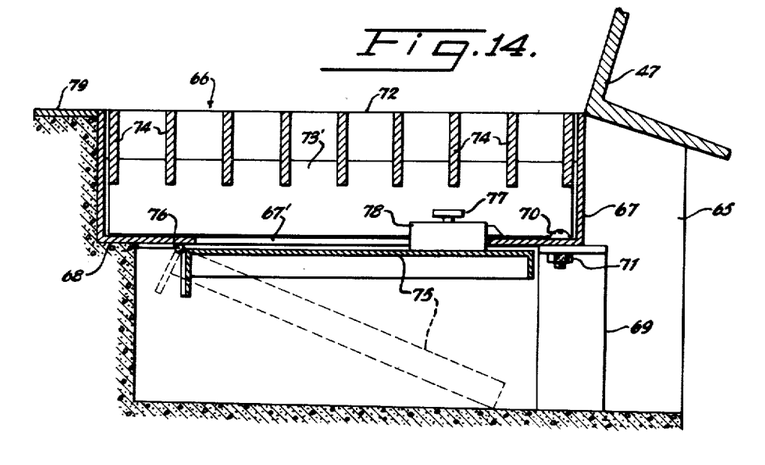
Figure 14 is a sectional view of the air intake grilles locates in the base of the display unit taken along lines 14—14 of Figure 2.
Figure 15:
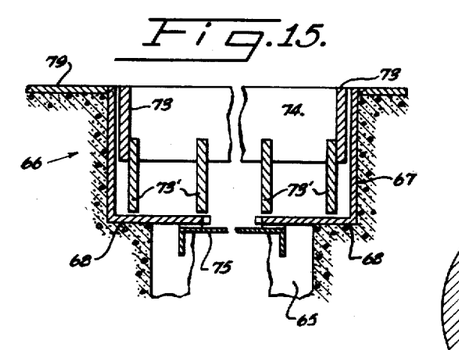
Figure 15 is a broken sectional view of the base air intakes taken along lines 15—15 of Figure 2.
Figure 16:
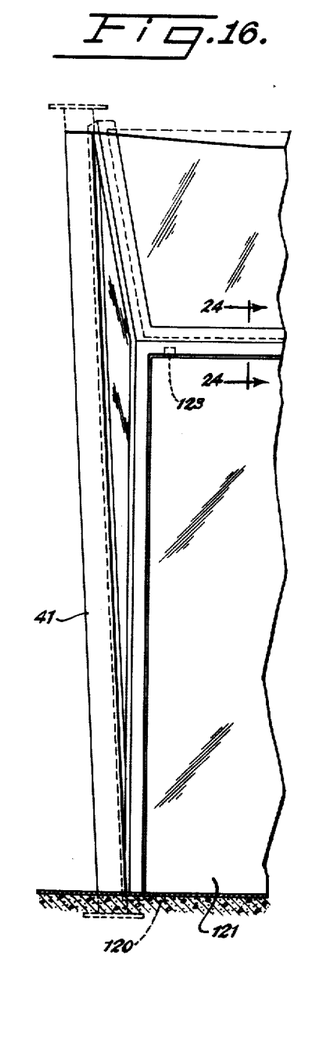
Figure 16 is a front elevation of part of the door frame structure.

Sudden air surges within the display unit which might cause cracking or breaking of the glass panels 56 are eliminated by providing a ventilating system comprising a plurality of air outlets, to be described later, and a plurality of air intakes. Referring to Figures 14, 15, it will be seen that air enters a plurality of openings 65 in the concrete base 40 on the outside of the display unit immediately below the horizontal channel irons 47 and then passes through the air intake unit 66 to the interior of the display room.

This air intake unit 66 is comprised of a box-like frame 67 resting upon the shoulders 68, preformed in the cement base 40, said box-like frame having an opening 67' in the bottom thereof. If desired, a flanged support 69 may be disposed within the opening 65 at a central position thereof, under the outermost portion of the box-like frame 67, and is removably secured thereto such as by a screw 70 and nut 71. Resting within the box-like frame 67 is a removable grille 72 composed of the upper and lower transverse members 73 and 73' interlockingly connected to longitudinal members 74. This grille may be easily removed from time to time when it requires cleaning.

Air is fed from the outside through the air intake unit 66 to the inside of the display unit by dropping the door 75 pivoted on the innermost bottom portion of the box-like frame 67 adjacent the opening 67' by means of the hinge 76, after turning the knob 77 of a conventional door-latch 78.

The interior of the display room may be provided with a floor 79 disposed upon the concrete base 40. The preferred embodiment of the invention contemplates rotatably mounting a conventional automobile turntable 80 within an annular depression 81 of substantially large diameter preformed in a central portion of the concrete base 40, the top of the turntable being substantially level with the floor 79 or the upper surface of concrete base 40. A plurality of rollers 82 located beneath the turntable 80 serve to retain the turntable in a level position as it rotates.

When glass wall panels are used the display unit is further provided with an entrance 83 whereby access may be had to the inside of the display unit, the entrance being sufficiently large so that an automobile may pass therethrough and be placed upon exhibit on the turntable 80 within the building. The entrance or doorframe unit 83 must be so constructed that it will not unbalance the equal distribution of the roof loads upon each of the tubular metallic columns 41.

Figures 21, 22:
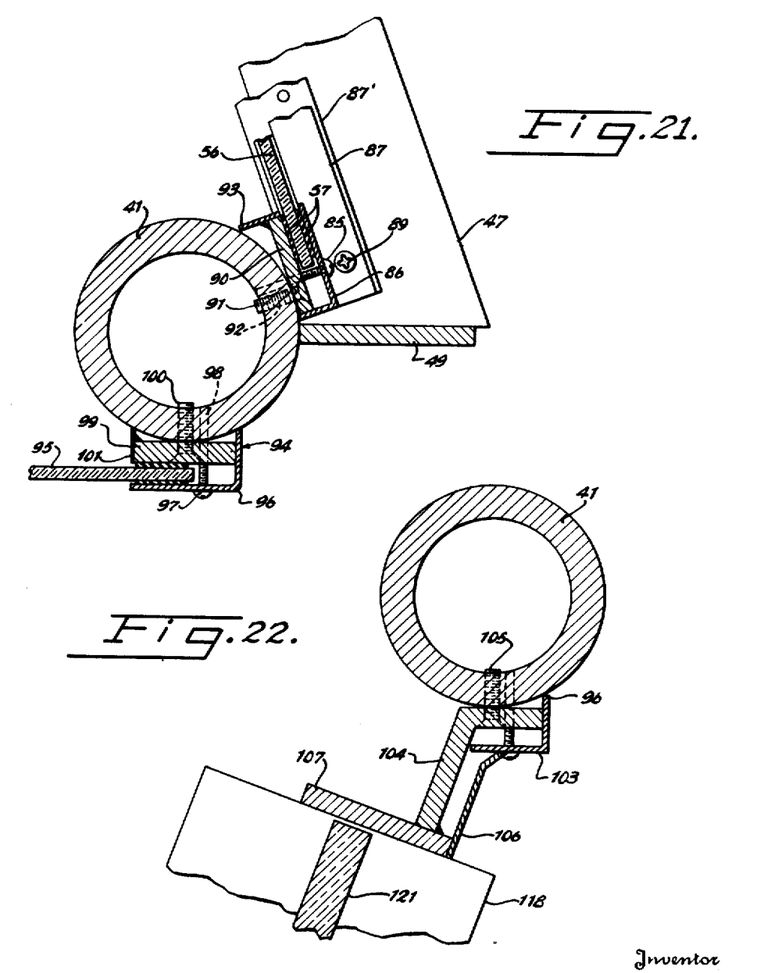
Figure 21 is a sectional view taken along the lines 21—21 of Figure 17.
Figure 22 is a sectional view taken along the lines 22—22 of Figure 17.

Accordingly, by referring to Figures 16, 17, 18, 21, 22, 23, and 24 it will be seen that such an entrance is satisfactorily provided. This entrance is comprised of two tubular metallic members 41, to each one of which at a point adjacent their lower outer extremities one end of a horizontal channel iron 47 is removably secured by being fastened to a gusset 49 as heretofore described. An angular strip 86, the lower portion of which is provided with a flanged arm 87, is removably secured to the tubular metallic columns 41 by means of a plurality of screws 85, the flanged arm 87 resting upon the upper surface of the horizontal channel iron 47 and extending substantially the length thereof. This flanged arm 87 takes the place of the strip 53 for holding in place the lower portions of the glass panels 56 immediately adjacent the entrance. If desired a reinforcing strip 87' such as is indicated in Fig. 21 may be inserted between the upper outer surface of channel iron 47 and the lower portion and flanged arm 87 of the strip 86. A second metallic strip 90 is located in parallel relation with strip 86 adjacent the tubular member 41 and removably secured thereto by any suitable means such as by the threaded screws 91, which are inserted in the bores 92 of the aforesaid tubular member. An edge of a glass panel may be thus sandwiched between the metallic strip 90 and the angular metallic strip 86 and cushioned therebetween by means of rubber tape 57, while the opposite end is secured to another metallic column 41 by means such as has been previously described. Thus, it will be seen that by turning the screw 85 the glass panel will be clampingly secured to the metallic tubular member 41 of the doorway unit.

In order to brace the metallic strip 90 more rigidly against the tubular member 41, a metallic strip 93 may be welded to an outermost extremity of the strip 90. Although a flange integral with said strip would also be satisfactory.

At an approximately 120° angle from the location of the aforesaid members about the outer periphery of the doorframe metallic tubular member 41, a second clamping means 94 for a glass panel 95 is disposed. This second clamping means 94 consists of an angular metallic strip 96 extending substantially the length of the tubular member 41, and secured thereto by means of a plurality of threaded screws 97 fitted in the bores 98 of the aforesaid tubular member. Positioned between the angular metallic strip 96 and the tubular member 41 but not extending substantially the length of the tubular member is a second metallic strip 99 removably attached to the metallic tubular member 41 by means of the screws 100. It can be easily seen that one edge of the glass panel 95 can thus be securely clamped and held in place by the above arrangement. A second metallic strip 101 similar to that indicated by 93 and of the same length as the metallic strip 99 may be welded thereto to brace the aforesaid strip to the tubular column 41.

Figure 17:
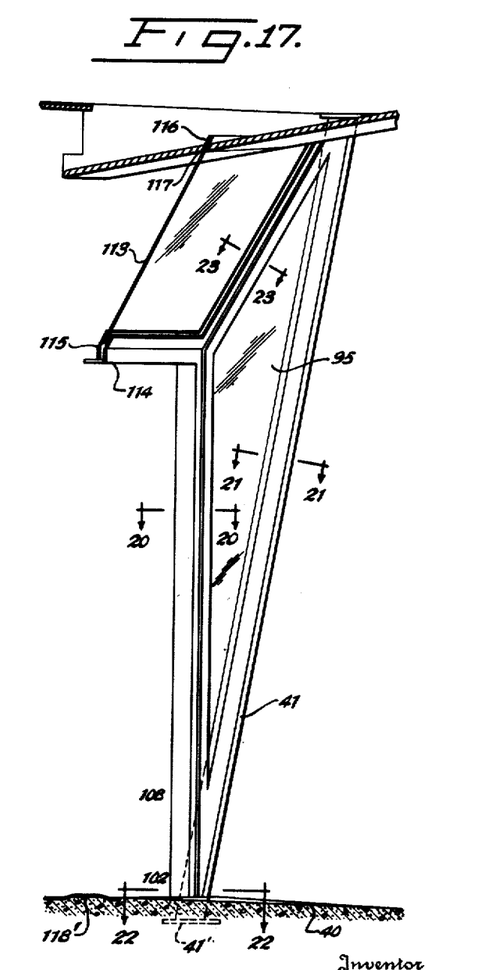
Figure 17 is a detailed view partly in section of a portion of the door frame structure.
Figure 18:
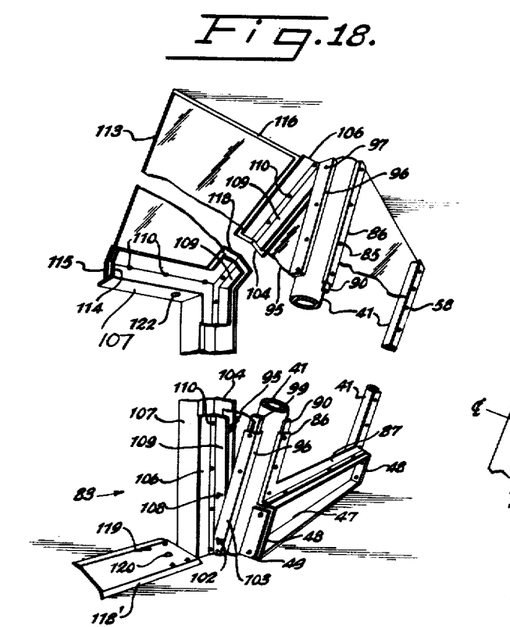
Figure 18 is a broken away perspective view of the entrance and the glass wall panels associated therewith.

As indicated by Figs. 17, 18 and 22 approximately at a point 102 near the lower extremity of the tubular column 41 the width of the inner side 103 of the angular metallic strip is decreased and a portion of one of the lower legs of an H-shaped metallic doorframe 104 having angularly shaped upper and lower legs and cross bar is disposed between the strip 96 and the tubular column 41 in place of the metallic strip 99, and secured thereto by suitable means generally indicated by 105. Welded to the crossbar and lower legs of the H-shaped metallic frame 104 at intermittent points is an inverted substantially U-shaped door frame bar 107. A second H-shaped metallic doorframe 106 having angularly shaped upper and lower leg and cross bar is positioned in parallel relation with the H-shaped frame 104 and in abutting relation with the outer extremity of the door frame bar 107.

By referring to Figs. 18, 20, 22, 23 and 24 it will be seen that lower extremities of the lower legs of the metallic frame 106 are removably fastened to the tubular members 41 while the upper portions of the lower legs, as well as the cross bar and upwardly and outwardly extending upper legs are fastened to the H-shaped frame 104 by means of the screws 110 inserted in a plurality of bores 111 of the frame 106 and subsequently engaging J-shaped studs 112 welded to the metallic member 104.

The width of the lower extremity of the lower legs of the H-shaped frame 106 is small as indicated in Fig. 22 and at a point 102 in Figs. 17 and 18 and is increased by means of the extension 109 along its length at a point 108 said width then being uniform along the remainder of its length. The width at the lower extremity of the legs being necessarily small so that the frame 106 and strip 103 may be joined together where they meet at the base of the entrance.

Thus, by means of the metallic strip 103, and frames 104 and 106, a glass panel 95 of roughly triangular shape may be positioned between the doorway proper and a tubular column 41.

Figure 20:
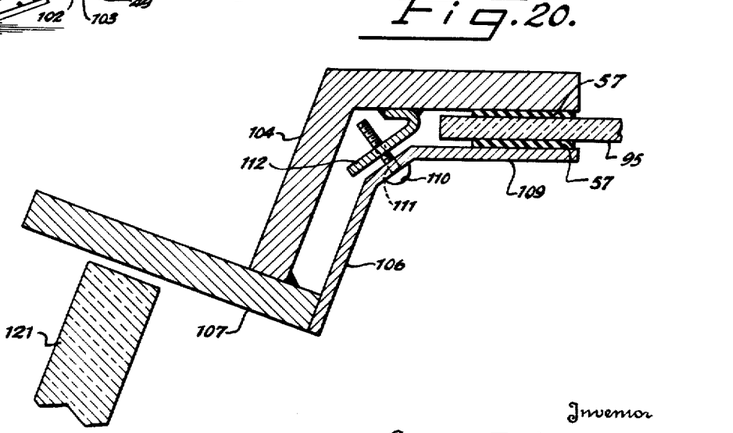
Figure 20 is a sectional view taken along the lines 20—20 of Figure 17.
Figures 23, 24:
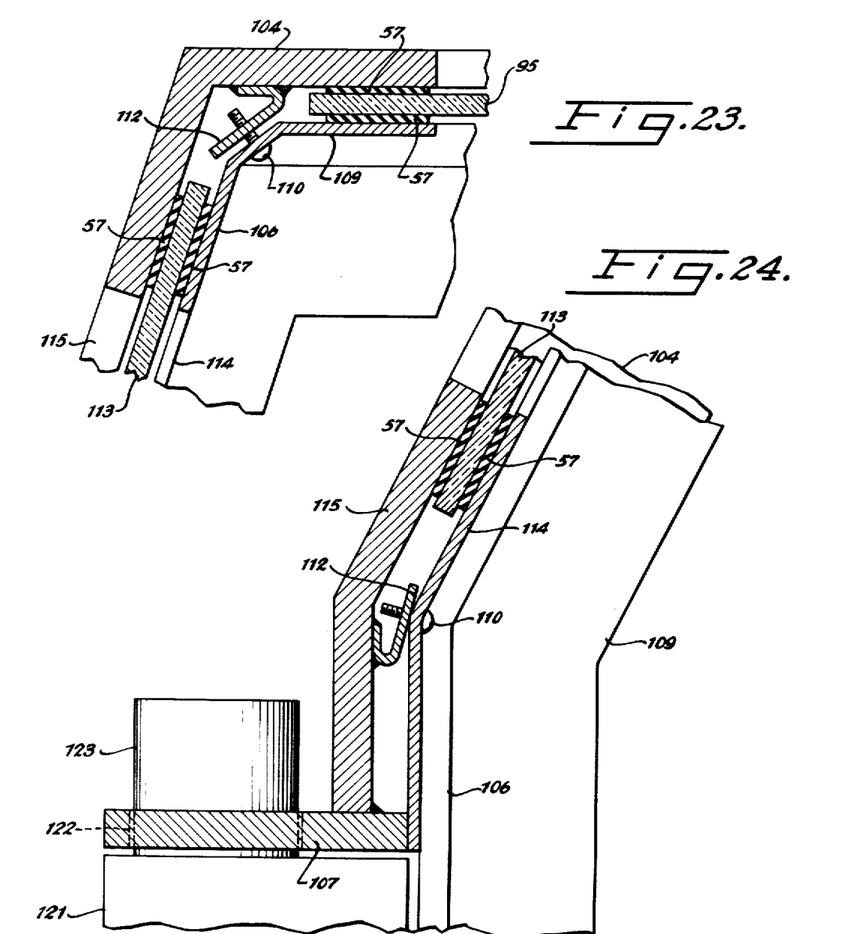
Figure 23 is a sectional view taken along the lines 23—23 of Figure 17.
Figure 24 is a sectional view taken along the lines 24—24 of Figure 16.

With further reference to the drawings and particularly to Figures 17 and 24, the lower edge of a glass transom 113 is clampingly engaged within the recess formed between the parallel, cross members 114 and 115 of the H-shaped frame 106 and the parallel H-shaped, metallic frame 104 respectively, by means similar to that disclosed in Figure 20 of the drawing. The upper end 116 of the transom glass 113 is felt covered before it is positioned in a recess 117 in the ceiling.

As indicated in Figure 23, the upper legs of the H-shaped frames 106 and 104 are parallely disposed upwardly and outwardly from the vertical and clampingly engage the upper portion of the glass panels 95 and glass transom 113 within the recess 118 formed between the said metallic frames by means similar to that disclosed in Figures 24 and 20.

Figure 19:
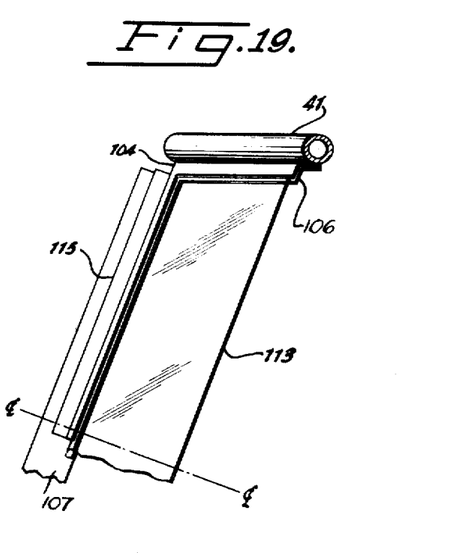
Figure 19 is a plan view of the doorway transom.

As best shown by Figure 19, the outermost extremities of the upper legs of the H-shaped frames 106 and 104 are affixed by suitable means to the upper extremity of a tubular metallic column and by completing a triangle of enclosing members secure the glass panel 95 in position. It will thus be seen that the upper and lower legs as well as cross bars of the doorframes 106 and 104 actually serve as strips between which edges of glass panels may be positioned.

Located in the doorway entrance is a threshold plate 118' fastened to the concrete base 40 by suitable fastening means generally indicated at 119.

The threshold plate 118' has disposed therein at each of its extremities a round hole 120 within which circular studs 123 attached to the lower extremity of glass doors 121, may be inserted. Similar circular studs 123 attached to the upper extremities of the doors 121 are housed in round holes 122 drilled in the outer extremities of the cross member of the doorframe bar 107. Studs 123 pivot within holes 122 and 120 as the doors are opened or closed.

By referring to Figures 6 and 9, it will be seen that in addition to supporting truss members 44, the horizontal bearing plates 42 also support substantially transverse roof reinforcing cross members 125, the latter thereby preventing lateral movement of the tubular metallic columns 41.

A plurality of angular gussets 126 are also disposed on top of the horizontal bearing plates 42 and are removably connected to the truss members 44 so as to furnish greater rigidity and strength to the truss members at this point, said truss members 44 being comprised of longitudinal members 127, with struts 128 and 129 welded thereto.

Figure 7:
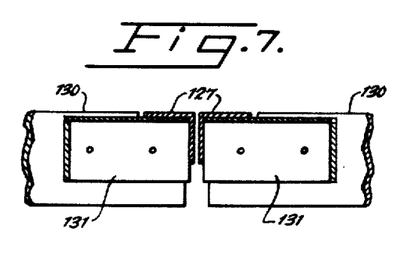
Figure 7 is a horizontal view taken along the lines 7—7 of Figure 6.
Figure 8:
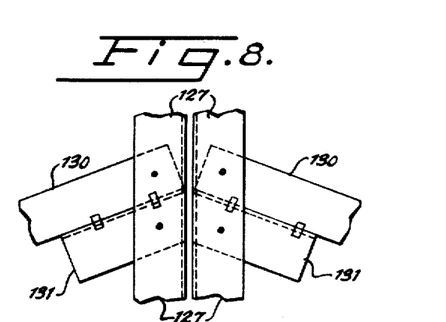
Figure 8 is a plan view taken along the lines 8—8 of Figure 6.

As best shown in Figures 7 and 8 cross beams 130, detachably connected to the inner portion of the upper longitudinal member 127 of the truss members 44 adjacent the point of intersection of the struts 128 and 129 of the said truss members, give additional strength and rigidity to the truss members and roof as a whole.

If desired, relatively short angle irons 131 may be joined to the cross beams 130 at their point of juncture with the truss members 44 in order to effect a more rigid joinder of the aforesaid beams and trusses.

Affixed to the outer extremities of the truss members 44 by suitable means is a plurality of curved channel shaped members 135, which form the outer periphery of the roof, to whose outer surfaces may be affixed an annular metallic ring 136. Strips preferably of plywood may be then stretched over and fastened to the framework of the roof described above to form an outer surface covering 137 for the same.

Detachably affixed to this outer surface covering 137 of the roof in spaced relationship to one another, is a plurality of channel supports 138, upon which are positioned an annular wire conduit pipe 139 for the floodlights 139', a wireway 140, upon which a plurality of individual housings 140' for fluorescent lighting units attached to the display letters indicated at 141 are located, and a flanged metallic strip 142, upon which the display letters 141 themselves are detachably fastened.

A plurality of overflow pipes generally indicated at 145 may be located in the roof to remove rainwater from the valley 145' formed by the roof contour.

Located at the outer periphery of the roof and substantially adjacent the doorway are a plurality of tubular members 146, 147 and 148, to which there is affixed a substantially glass panelled switch box 149, within which are located the electrical switches, fuses, etc., for the interior and exterior lighting units of the building, as indicated by point 150. The tubular member 148 also may serve as a drain pipe for one of the overflow pipes 145. Tubular members 146 and 147 have openings at the middle portion thereof to permit the insertion of electrical wires running from the switch box 149 to the annular electrical conduit 139 and the fluorescent lighting housing units 140'.

As shown in Fig. 6 dependingly affixed to the lower portion of the truss members 44 adjacent their outer extremities, by means of gussets 152, are a plurality of channel irons 153, providing a base for effecting a downward slope of the ceiling 62 at this point.

A second plurality of channel irons 155 are dependingly fastened to the lower portion of the truss members 44 by being welded to gussets 156 removably fastened to the latter, thereby providing an aperture 154 between the truss members 44 and the inner portion of the plaster ceiling 62, said aperture extending in the form of an annular ring between the inner and outer portions of the plaster ceiling. An annular exhaust grille 157 is located within the aperture 154 through which the foul air within the display unit passes to the outside by a method to be described later.

A plurality of lights 158 are positioned within the ceiling to illuminate the interior of the display unit.

A railing 160 may also be provided for the interior of the display room by fastening the same in a suitable manner to the tubular metallic columns 41.

Although any suitable weight supporting means may be positioned upon the roof at the central portion thereof it is the preferred embodiment of this invention to mount a rotatable weight bearing member such as an automobile turntable with an automobile positioned thereon upon the roof.

Thus, with further reference to the drawings and particularly Figures 3, 5, 25 and 30, a roller pedestal base plate 162 resting upon and detachably affixed to the inner extremities of truss members 44 and the cylinder 45 is located in the substantially center portion of the roof structure.

Figures 4, 5:
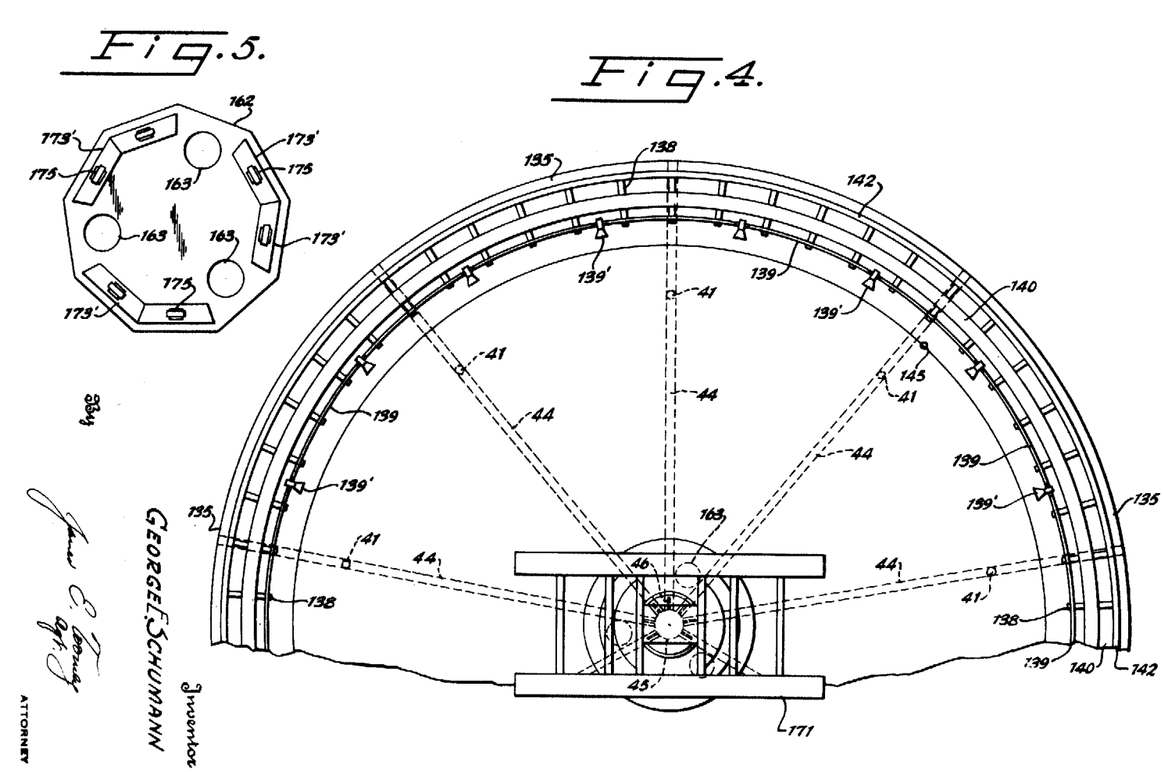
Figure 4 is a plan view of a portion of the roof.
Figure 5 is a plan view of the roller pedestal base plate which supports the rollers positioned beneath the turntable mounted upon the roof.
Figure 25:
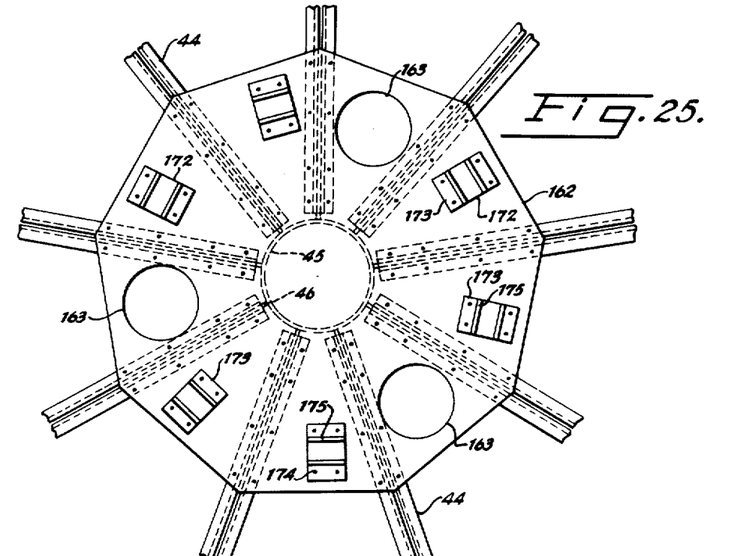
Figure 25 is another plan view of the roller pedestal base plate.

A plurality of circular openings 163, together with an associated duct 163', is located in the roller pedestal base plate 162 within which exhaust fans 164 are suitably disposed to draw the foul air flowing through grille 157 as heretofore described, and emit the same to the outside of the display unit through the opening 168 between the skirt member 169 to be described later, and the annular flange 170 affixed to the roof surface covering 137.

In order to facilitate the rotation of a weight bearing platform or rotatable member such as an automobile turntable 171 and to provide a convenient means for leveling the turntable during its installation, thereby preventing the unequal distribution of stresses upon the pedestals, as well as to eliminate excessive shaft deflections due to occasional gusts of winds striking the display automobile mounted on the turntable during its rotation, a plurality of peripherally spaced roller elements 172 are positioned upon the roller pedestal base plate 162.

Figure 26:
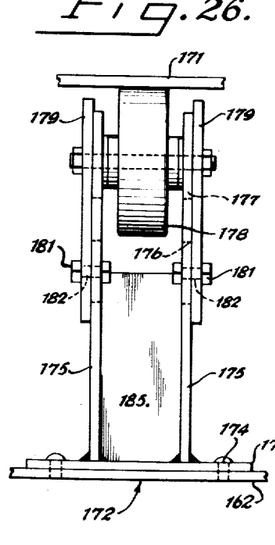
Figure 26 is a front elevation of a roller mounted upon the pedestal base.
Figure 27:
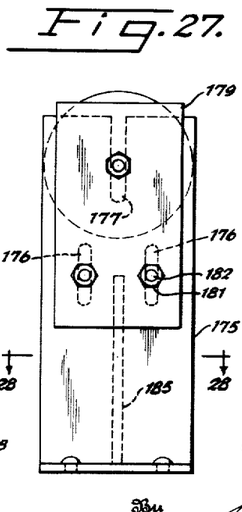
Figure 27 is a side elevational view of a roller mounted on the pedestal base.
Figure 28:
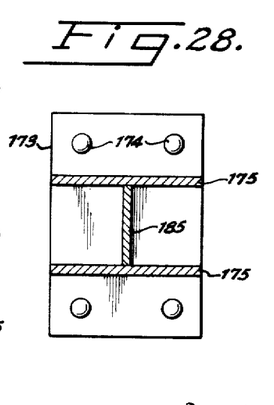
Figure 28 is a sectional view taken along line 28—28 of Figure 27.

As best shown by Figures 26, 27 and 28, the roller elements 172 are comprised of a base plate 173, shown in an alternate form as 173' in Figure 5, removably affixed to the roller pedestal base plate 162 by means indicated at 174. By welding upright metallic standards or pedestals 175 to the base plates 173 and providing the former with longitudinal orifices 176 and a longitudinal aperture 177, secondary standards 179 retaining a roller 178 between them can be adjustably and detachably secured to the said standards 175 in a manner such as is indicated in Figs. 26 and 27, by loosening or tightening the nuts 181 on the bolts 182. Thus, the roller 178 may be moved either downwardly or upwardly to the desired position and into or out of contact with the rotating weight bearing member 171.

To furnish additional strength and support to the upright standards 175 the relatively short bar 185 may be inserted between the same and welded thereto.

Figures 29, 30, 31:
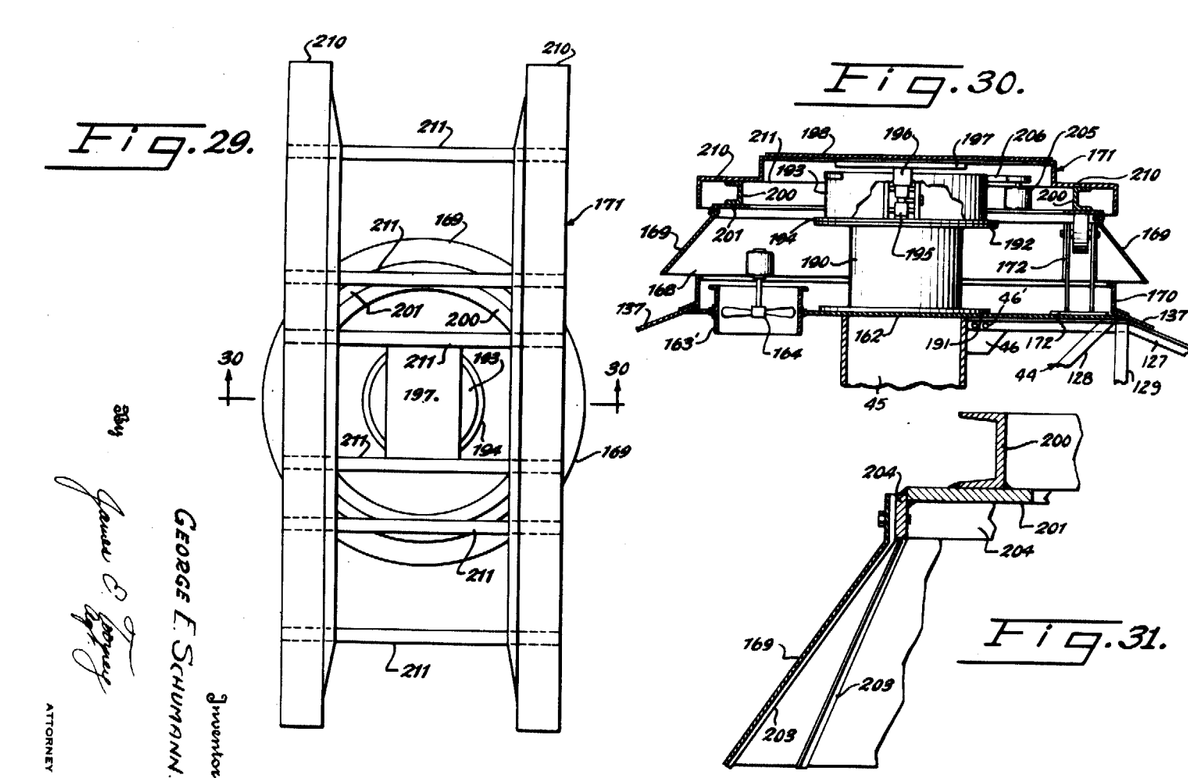
Figure 29 is a plan view of the automobile turntable mounted upon the roof of the structure.
Figure 30 is a sectional view taken along the lines 30—30 of Figure 29, and with portions of the central pipe member and a roof supporting member added and indicates the position of the turntable with respect thereto.
Figure 31 is an enlarged fragmentary sectional view showing how the annular ring is mounted upon the frusto conical skirt.

Removably disposed upon the center portion of the roller pedestal base 162 is a cylinder 190 provided with an annular flanged base 191 and a circular cover plate 192 which furnishes support to a drum 193 also provided with an annular flanged base 194.

Located within the drum 193 are journalling means 195 for a vertical shaft 196 to which is affixed a substantially rectangular bearing plate 197 upon which is mounted and fastened a rotatable platform or automobile turntable 171 comprised of channeled runways or tracks 210, strut supports 211 and, if desired, a cover plate 198.

The inner portion of the rotating weight bearing platform or turntable 171 is reinforced by a channel shaped annular ring 200 having its upper flange secured to the rotating platform and its lower flange secured to a horizontal annular plate 201, as best shown in Figure 31. It is this horizontal annular plate or track 201 which directly contacts the rollers 178 as the weight bearing platform rotates. By utilizing the annular plate 201 and the associated ring 200 most of the weight of the platform 171 is distributed upon the rollers and excessive strains upon the shaft 196 prevented. Welded to the horizontal annular plate 201 adjacent its outer periphery is an annular ring member 204 to which is removably secured a frustro conical skirt 169 adapted to protect the rotating means for the turntable from exposure to the elements. Spacing bars 203 may be inserted between the annular strip 204 welded to the horizontal annular plate 201 and the frustro conical skirt 169 at the point of juncture to reinforce the said skirt.

An electric motor 205 is affixed to the rotatable weight bearing member 171 in any suitable way such as for example by being removably fastened to the inner periphery of the channel shaped annular ring 200. A belt 206 passes from the motor 205 to and around the drum 193, thereby forming a direct drive for the rotatable platform 171 so that upon actuation of the motor the rotatable platform 171 and associated display automobile will turn about the vertical axis.

If two turntables are used one being on the roof and the other within the unit they can rotate either in the same or different directions without any decrease in the efficiency of the unit as a weight bearing structure.

From the foregoing description, it will readily be seen that the display unit herein disclosed is of novel construction in that a roof structure is provided which is adapted to support relatively large, concentrated loads, such as an automobile turntable at a central portion thereof, and one which is easily assembled or dismantled. The type of construction embodied in this disclosure provides an equal distribution of the entire roof load upon each of the tubular metallic columns enabling them to carry all the loads or internal stresses present in a wall structure, without subjecting the glass wall panels themselves to structural loads. In addition, by the use of glass wall panels having their lower edges offset outwardly from the vertical, the visibility of the structure is substantially improved by eliminating the reflections normally produced by vertically disposed glass panels. Furthermore, unobstructed vision is attained, since glass wall panels are employed without the use of detracting cross bracing.

It will be readily appreciated from the foregoing description that in addition to functioning as a display unit for automobiles, the structure herein described is adapted to be used for numerous other purposes and could readily house a refreshment stand, restaurant or the like. Consequently, many modifications or changes could be made in the invention without departing from the spirit and scope thereof and it is not to be taken to be limited to the disclosure recited above, but only by the appended claims wherein what is claimed is:

1. In a building structure of the type described, the combination of a base, a plurality of circumferentially spaced apart upstanding columns mounted upon and secured to the said base, each of said columns also slanting slightly outwardly therefrom, tie means securing adjacent columns together at their upper extremities, a plurality of radially disposed roof supporting members, each of which is supported adjacent its outer extremity by one of the said columns, a vertically disposed central pipe member to which the inner extremities of said roof supporting members are detachably connected, said central pipe member also being of such a length that the bottom extremity thereof is spaced from and is unsupported by the said base, a platform of substantial size mounted on the top of the building structure adjacent the said vertically disposed central pipe member and the inner extremities of the roof supporting members for rotational movement above a vertical axis concentric with the axis of said pipe member, and adjustable support means interposed between the said platform and said roof supporting members and maintaining said platform in a balanced horizontal position.

2. The combination defined in claim 1, wherein said support means includes a plurality of circumferentially disposed, individually and vertically adjustable wheel elements.

3. A display unit of the type described comprising a base, a plurality of circumferentially spaced apart upstanding columns mounted upon the said base, each of said columns also slanting slightly outwardly from the vertical, tie means securing adjacent columns together at their upper extremities, glass wall panels positioned between and secured to a majority of pairs of said columns, door means for said display unit, a plurality of radially disposed roof supporting members, each of which is supported adjacent its outer extremity by one of the said columns, a vertically disposed central pipe member to which the inner extremities of said supporting members are detachably connected, a turntable mounted on the top of said display unit adjacent the vertically disposed central pipe member and the inner extremities of said roof supporting members for rotational movement about a vertical axis concentric with the axis of said pipe member, said central pipe member also being of such a short length that the bottom extremity thereof is spaced from and is unsupported by the said base, and adjustable support means interposed between the turntable and said supporting members and maintaining said turntable in a balanced horizontal position.

4. The combination defined in claim 3, wherein said support means includes a plurality of circumferentially disposed individually and vertically adjustable wheel elements.

5. In a closed building structure of the type described, the combination of a base, air admission means mounted within said base and adjacent the outer periphery thereof, a plurality of circumferentially spaced apart upstanding columns mounted upon the said base, each of said columns also slanting slightly outwardly from the base, tie means securing adjacent columns together at their upper extremities, glass wall panels positioned between and secured to a plurality of pairs of adjacent columns, door means for said building structure, a plurality of radially disposed roof supporting members, each of which is supported adjacent its outer extremity by one of the said columns, a vertically disposed central pipe member to which the inner extremities of the said roof supporting members are detachably connected, said central pipe member also being of such a length that the bottom extremity thereof is spaced from and is unsupported by the said base, a platform of large size mounted on the top of said building structure adjacent said vertically disposed central pipe member and the inner extremities of said roof supporting members for rotational movement about a vertical axis concentric with the axis of said pipe member, and adjustable support means interposed between the platform and said roof supporting members and maintaining said platform in a balanced horizontal position.

6. The combination defined in claim 5, wherein said support means includes a plurality of circumferentially disposed individually and vertically adjustable wheel elements.

References Cited in the file of this patent

UNITED STATES PATENTS

| Number | Name | Date |
|---|---|---|
| 353,168 | Shaw | Nov. 23, 1886 |
| 729,642 | Nash | June 2, 1903 |
| 827,030 | Noblett | July 24, 1906 |
| 836,614 | Sutherland | Nov. 20, 1906 |
| 871,306 | Thurlow | Nov. 19, 1907 |
| 1,267,684 | Moomaw | May 28, 1918 |
| 1,689,160 | Siegrist | Oct. 23, 1928 |
| 1,818,647 | Pronnecke | Aug. 11, 1931 |
| 1,898,641 | Mugnani | Feb. 21, 1933 |
| 1,925,284 | Shodron et al. | Sept. 5, 1933 |
| 2,043,174 | Jacobson | June 2, 1936 |
| 2,052,121 | Venzie | Aug. 25, 1936 |
| 2,351,419 | Fuller | June 13, 1944 |
| 2,360,831 | Drew | Oct. 24, 1944 |
| 2,400,421 | Johnson | May 14, 1946 |
| 2,433,677 | Thomas | Dec. 30, 1947 |

FOREIGN PATENTS

| Number | Country | Date |
|---|---|---|
| 814,613 | France | Mar. 22, 1937 |

UNITED STATES PATENT OFFICE
CERTIFICATE OF CORRECTION

Patent No. 2,706,538

April 19, 1955

George E. Schumann

It is hereby certified that error appears in the printed specification of the above numbered patent requiring correction and that the said Letters Patent should read as corrected below.

Column 1, line 32, for "advantages" read -- disadvantages --; column 5, line 23, for "leg" read -- legs --.

Signed and sealed this 30th day of December 1958.

(SEAL)
Attest:

KARL H. AXLINE
Attesting Officer

ROBERT C. WATSON
Commissioner of Patents